Sept. 16, 1924.

A. ASTRUP

CUTTER

Filed May 17, 1923

1,508,869

Inventor
Andrew Astrup

Patented Sept. 16, 1924.

1,508,869

UNITED STATES PATENT OFFICE.

ANDREW ASTRUP, OF RACINE, WISCONSIN, ASSIGNOR OF ONE-HALF TO SYLVESTER E. McKEE, OF RACINE, WISCONSIN.

CUTTER.

Application filed May 17, 1923. Serial No. 639,475.

*To all whom it may concern:*

Be it known that I, ANDREW ASTRUP, a citizen of the United States, and resident of Racine, in the county of Racine and State of Wisconsin, have invented certain new and useful Improvements in Cutters; and I do hereby declare that the following is a full, clear, and exact description thereof.

This invention relates to cutters, and is particularly directed to a power driven cutter for shearing sheet material.

Objects of this invention are to provide a portable power driven cutter for cutting sheet material, to provide a cutter so organized that it may follow either a straight or a curved line with the utmost facility, to provide a unitary structure equipped with supporting handles and provided with co-operative rotary shearing cutters, and a power driven reduction gear driving such cutters.

Further objects are to provide a device for cutting sheet material which is provided with a frame having a cut-out adapted to receive the projecting portion of sheet material and having rotary power driven cutters located adjacent the ends of the frame and projecting into the cut-out portion with the cutters in contact so as to execute a shearing cut upon the sheet material.

An embodiment of the invention is shown in the accompanying drawings.

Figure 1:
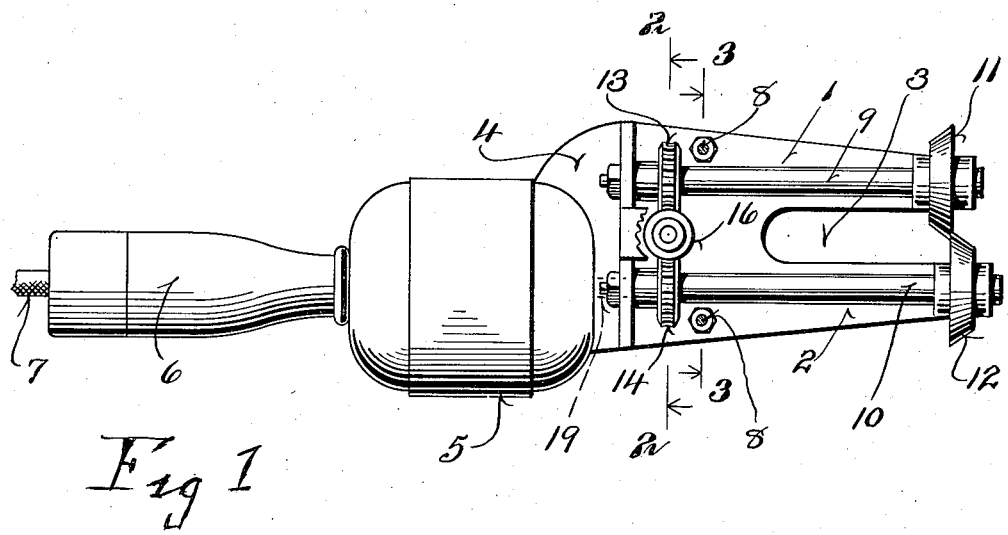
Figure 1 is a view of the entire machine, with certain of the handles and a supporting bracket, broken away for the sake of clearness.
Figure 2:
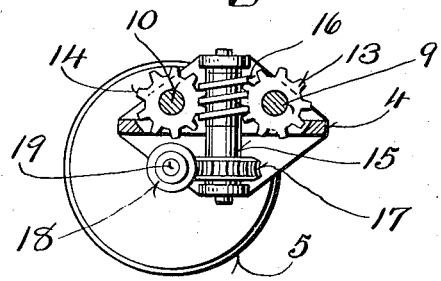
Figure 2 is a sectional view on the line 2—2 of Figure 1.
Figure 3:
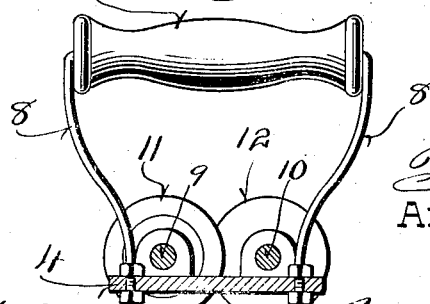
Figure 3 is a sectional view on the line 3—3 of Figure 1.

The machine comprises a U-shaped frame having projecting arms 1 and 2 and a defined cutout space 3. These arms are joined by an enlarged base 4 to which is rigidly attached an electric motor 5. A handle 6 projects rearwardly from the motor and houses the electric cable 7 for the motor. A second handle 7 is carried by a frame whose arms 8 are bolted to the main frame 4 so as to space the handle 7 outwardly from the frame.

A pair of parallel shafts 9 and 10 are carried by the frame and project along and beyond the arms 1 and 2, being carried in suitable bearings adjacent their outer and inner ends. The projecting portions of the shafts carry rotary cutters 11 and 12, respectively, whose flat faces contact—the cutters being arranged to execute a shear cut upon sheet material as the cutter is bodily fed along the material, the overhanging portion of the material being accommodated by the cut-out portion 3. The inner end of the shafts 9 and 10 are provided with worm wheels 13 and 14 which are so arranged in the same plane and are spaced from each other. A shaft 15 extends upwardly between the worm wheels and is provided with a worm 16 cooperating with and positioned between such worm wheel. The lower end of the shaft carries a worm 17 which meshes with a worm wheel 18 carried by the motor shaft 19.

It will thus be seen that when the motor is operated a double reduction takes place— that is to say, one reduction occurs between the worm wheel 18 and the worm 17 and the other reduction occurs between the worm 16 and the worm wheels 13 and 14. It is to be noted that the worm 16 moves the worm wheels 13 and 14 in opposite direction and consequently rotates the cutters 11 and 12.

In using the device, it is supported by the handles 6 and 7 and is bodily fed along the sheet material with the overhanging portion thereof positioned within the cut-out portion 3. The rotary cutters 11 and 12 execute a shearing cut upon the material, and, as is obvious, are adapted to follow either a straight or a curved line with the utmost facility. These cutters do not require any effort on the part of the operator, and consequently his entire attention may be given to guiding the portable cutter, thereby producing the exact cut desired.

It will thus be seen that a portable power driven cutter has been provided which is eminently adapted for the purpose intended, which is of light weight, which is compact, and which may be most readily manipulated.

Although one specific form of the invention has been described in considerable detail, it is to be understood that the invention may be variously modified and is to be limited only as defined in the appended claims.

I claim:—

1. A portable power driven machine for cutting sheet material comprising a frame, an electric motor secured thereto, a pair of parallel shafts carried by said frame, co-operating rotary shear cutters carried by the outer ends of said shafts, a pair of worm wheels spaced from each other and carried by the inner ends of said shafts, and a worm operatively coupled to said motor shaft and positioned between said worm wheels and in driving relation thereto.

2. A power driven cutter for sheet material comprising a pair of parallel shafts, a U-shaped frame supporting said shafts by the arms of said frame, a pair of rotary cutters carried by the outer end of said shafts and having contacting flat faces, a pair of worm wheels carried by the inner ends of said shafts and spaced apart, a shaft having a worm engaging said worm wheels and positioned therebetween, a worm wheel carried by said last mentioned shaft, and an electric motor having a shaft provided with a worm operatively coupled to said last mentioned worm wheel.

In testimony that I claim the foregoing I have hereunto set my hand at Racine, in the county of Racine and State of Wisconsin.

ANDREW ASTRUP.